(12) United States Patent
McDermott (10) Patent No.: US 9,452,848 B2
(45) Date of Patent: Sep. 27, 2016

(54) METHOD AND APPARATUS FOR CLEANING JET ENGINES

(71) Applicant: Rochem Aviation, Inc., Portland, OR (US)

(72) Inventor: Peter McDermott, London (GB)

(73) Assignee: Rochem Aviation, Inc., Portland, OR (US)

( * ) Notice: Subject to any disclaimer, the term of this patent is extended or adjusted under 35 U.S.C. 154(b) by 267 days.

(21) Appl. No.: 14/074,039

(22) Filed: Nov. 7, 2013

(65) Prior Publication Data

US 2015/0122292 A1 May 7, 2015

(51) Int. Cl.
*B08B 9/00* (2006.01)
*B08B 3/02* (2006.01)
*B64F 5/00* (2006.01)
*F01D 25/00* (2006.01)

(52) U.S. Cl.
CPC ............... *B64F 5/0018* (2013.01); *B08B 3/02* (2013.01); *B08B 9/00* (2013.01); *F01D 25/002* (2013.01); *Y02T 50/671* (2013.01)

(58) Field of Classification Search
USPC ......... 134/18, 23, 22.18, 32, 40, 104.2, 105, 134/113, 169 R
See application file for complete search history.

(56) References Cited

U.S. PATENT DOCUMENTS

| 2,046,581 | A | 7/1936 | Reeves |
| 4,170,489 | A | 10/1979 | Magnus et al. |
| 5,011,540 | A | 4/1991 | McDermott |
| 8,109,807 | B2 | 2/2012 | Giljohann et al. |
| 8,444,773 | B2 | 5/2013 | Tadayon |
| 2002/0122730 | A1 | 9/2002 | Dexter et al. |
| 2006/0081521 | A1 | 4/2006 | Hjerpe et al. |
| 2008/0040872 | A1* | 2/2008 | Hjerpe ..................... B08B 3/02 15/3 |
| 2009/0159517 | A1* | 6/2009 | Rice ........................ B08B 17/00 210/171 |
| 2013/0240002 | A1 | 9/2013 | Hjerpe |

* cited by examiner

*Primary Examiner* — Saeed T Chaudhry
(74) *Attorney, Agent, or Firm* — Ladas & Parry LLP (57) ABSTRACT

An apparatus for the cleaning of a turbine engine comprises a towable wash cart having a reservoir for cleaning fluid. The reservoir is connected through a pump system to a wash ring operatively mounted to the cart. The wash ring has a plurality of spray nozzles about its periphery arid positionably adjustable for directing an atomized spray of the cleaning fluid into an inlet of the engine. The cart and wash ring is aligned with the engine such that there is no physical contact between the wash ring and engine during the entirety of the cleaning process. While a preferred cleaning fluid is pure water, the reservoir may be segmented to carry a number of different cleaning solutions, which can be mixed in a manifold of the pump system as may be desired for a particular cleaning process. The reservoirs may be heated and insulated to maintain the cleaning solutions at an elevated temperature. A sluice cart may be provided to collect cleaning fluid draining for the engine for delivery to a collection tank on the wash cart.

23 Claims, 8 Drawing Sheets

METHOD AND APPARATUS FOR CLEANING JET ENGINES

The present invention relates to a method and apparatus primarily for the cleaning of aircraft turbofan or turbojet engines of any kind. The system may also be utilized tor the cleaning of turbo-shaft engines of helicopters as well as many types of aero-derivative industrial gas turbines.

BACKGROUND OF THE INVENTION

Jet engines, and particularly the compressors of aircraft jet engines and helicopter turbo-shaft engines, are subject to contamination from the ingestion of general airborne pollution, as well as unburned hydrocarbons (soot), lubricating oil vapors etc., emanating from other aircraft engines when maneuvering around airports and on take-off and landing. Such contamination can lower engine efficiency, lead to undesirable increases in exhaust gas temperature and in extreme cases can result in engine failure.

Accordingly, to maintain engine fuel efficiency and power output, as well as the avoidance of potential engine failure, the cleaning of the gas path of jet engines is recommended and, in many cases, is now a requirement mandated by engine OEMs in order to assure and maintain performance guarantees. Such cleaning may be as part of non-preventative maintenance and/or performance recovery procedures, as well as being performed as a routine preventive maintenance procedure to help extend the useful life of hot-end components by helping to keep exhaust gas temperatures within required or desired limits. Cleaning of a jet engine helps to maintain its overall efficiency, as even moderately dirty engine can easily result in about a 0.5 to 1.5% increase in fuel consumption. Regular or programmed engine washing, when done properly, is thus a relatively inexpensive way of conserving resources and saving significant amounts of money. And given the prodigious amounts of jet fuel used on a daily basis and today's high fuel costs, keeping jet engines clean can directly affect an airline's bottom line. Similarly, periodic cleaning of the compressors of helicopter turbine engines—which can become even more fouled than jet engines because of their lower and more polluted operating heights—is a necessity to maintain fuel efficiency and engine reliability and avoid potential catastrophic failure.

While the cleaning of a jet engine can be accomplished as part of the disassembly of the engine, engine cleaning, particularly as a preventive maintenance act and/or to combat excess fuel burn, is normally performed with the engine in-situ on the aircraft. This is commonly referred to as on-the-wing-cleaning.

Effective cleaning requires that the stator and rotor blades of the engine compressor be uniformly cleaned and flushed. On-the-wing hand-cleaning is almost totally ineffective because only the first few stages of the compressor are accessible by hand; most of the compressor remains uncleaned. There is also no possibility whatsoever of hand cleaning any part of the combustion system or turbine, so an effective cleaning system or method most be designed to reach all the rotor and stator elements throughout the entire engine assembly.

A commonly utilized method for the cleaning of a jet engine comprises the spraying of a cleaning liquid into the engine compressor inlet as it is operated in the dry cranking mode of the engine's starting system using compressed air from the aircraft's own auxiliary power unit (APU) or an external source of ground power as its motive power. This is commonly known as a "motoring wash" in which the engine is turned or motored (with fuel isolated) up to a selected speed (typically between 10 to 20% of its N2 shaft speed). By motoring, or cranking the engine in this manner sufficient air flow is generated through the engine to effectively draw in the cleaning and rinse solutions, which break down and wash off the accumulated foulant from the compressor section. Some of the removed foulant will be carried in the air flow completely through the engine and be expelled with the exhaust flow, thus having a secondary cleaning effect on the turbine section, while some may drain away by gravity with the wash fluid and rinse water to the lower half of the engine where it can be collected and drained to a tank or receptacle for safe disposal or separation after the engine wash procedure is completed.

Often the cleaning liquid is warm or hot water (typically in the range of 70 to 200° F.) either alone or with the addition of detergent-type additives. In earlier times—before the development of cooled turbine blades by pre-heated bleed air from the compressor—mild abrasives such as rice husks, crushed pecan shells or carbon based powders were injected into the compressor to scour the airfoils and removed surface deposits. However, with the introduction of turbine cooling by compressor bleed air—now utilized in the vast majority of gas turbines and jet engines—the use of such solid abrasives came to an end in these types of gas turbines because of the danger of blade cooling channels and ports being plugged up by the cleaning abrasive itself and the subsequent and rapid high temperature failure of turbine blades.

For jet engine or turbojet cleaning the cleaning solution and rinse water spray nozzles are often affixed to simple hand-held wands that are manipulated across the area of the engine inlet by maintenance personnel, although uniformity of cleaning is very difficult to achieve with this procedure. In addition, this cleaning method requires the operator to stand directly in front of the engine inlet while it is being motored, thus potentially creating a very serious hazard to the operator and the engine.

U.S. Pat. No. 8,109,807 discloses a cleaning system that consists of a disc carrying a number of spray nozzles which is held against the engine's central "spinner" by a bolting system which attaches to and through the fan blades of the engine. The cleaning solution and rinse water is delivered to the nozzles through a rotational coupling which attaches to the center of the nozzle disc. As the engine is spooled up by its starting system the disc and its nozzles rotate with the spinner and the wash solution and rinse water is injected though the fan blades and into the compressor of the engine core.

In another process, as set forth in U.S. Pat. No. 4,170,489, cleaning solution is dispensed through the engine's fuel nozzles themselves. This is only suitable for potential cleaning of the fuel nozzles, combustors and turbine and not the compressor, which is the source of most engine fouling and performance loss. Dispensed detergent mixture is introduced and allowed to remain on the fuel nozzles for a soak period, followed by a pulsating detergent spray followed in turn by a pressurized alt purge to clear the fuel nozzles and dry the internal surfaces of the combustion system and turbine.

In the system disclosed in U.S. Pat. No. 8,444,773, a J-hook on a Song lance is introduced into the engine from the rear and affixed-to the lip of the core engine compressor inlet. Cleaning solution and rinse water is injected into the compressor. The entire engine is also wrapped m a waterproof cover to collect the drainage.

Conventional jet engine wash systems and techniques, such as those described above, typically require either continued monitoring and positioning of the spray equipment by personnel or the affixation of the spray devices to the engine. Such procedures can be time intensive, require careful alignment and positioning, and can result in very serious damage to the engine if not carefully positioned and retained properly. Accordingly, there is a need for a jet engine cleaning apparatus and methodology which avoids the shortcomings of conventional systems, which does not require contact with critical engine parts or insertion into the engine interior and which allows the efficient and controlled use of cleaning solutions in a repeatable process and procedure to give consistent and predictable cleaning results.

BRIEF DESCRIPTION OF THE INVENTION

In accordance with the foregoing, the cleaning apparatus of the present invention comprises a cart-mounted system able to be accurately and easily positioned with respect to an engine to be cleaned. Mounted to the cart is a wash ring with a plurality of spray outlets. The wash ring is positioned to accurately direct cleaning spray from a series of spray nozzles about and within the full periphery of the core-engine inlet, providing full and complete spray coverage for the entirety of the engine surfaces. As the wash ring and its support assembly is firmly attached to the wash cart there is no need for physical contact between the spray system and any part of the engine or its inlet structure.

The specific number and positioning of the spray outlets about the ring ensure uniform root to tip cleaning of both rotating and stationary airfoils of the core compressor and the main fan, while the physical size of the ring ensures compatibility with the inlet annulus of the core engine. Non-contact alignment means are provided to insure that the wash ring is positioned properly and centrally to the engine compressor and main fan. Thus, with the correct parameters established automatically by the system for the engine to be cleaned, the likelihood of operator error is minimized and the results of the cleaning operation maximized. The cart is fully self-contained, requiring no external power source and further may include separate heated and insulated reservoirs for the cleaning fluid and rinse water as well as a pump system to deliver the cleaning fluids to the wash ring at the required pressure and flow. Ancillary components, such as flood lights and a sun shade for operating personnel may also be provided. Other peripherals, such as a small demineralizing system and/or a waste water post treatment system can be mounted on the wash cart to provide demineralized wash water (which may be an engine OEM requirement) and/or a means of post treatment of collected and contaminated waste water from the engine wash.

While the majority of cleaning fluid injected into engine passes through the engine exhaust, it is possible for a quantity of fluid to remain in the engine, and fall to the bottom of the engine's housing or nacelle. To retrieve such fluid a collection cart may be positioned below the engine, the remaining cleaning fluid exiting the nacelle through weep holts and falling onto a collection sluiceway of the collection cart. The sluiceway may be gently sloped to allow the fluids to flow into a collection tank located on the wash cart, avoiding the deposition of such fluid on the ground.

BRIEF DESCRIPTION OF THE DRAWINGS

A fuller understand of the present invention will be accomplished upon consideration of the following detailed description of an illustrative embodiment of the invention when reviewed in conjunction with the annexed drawings wherein.

DETAILED DESCRIPTION OF THE INVENTION

Figure 1:
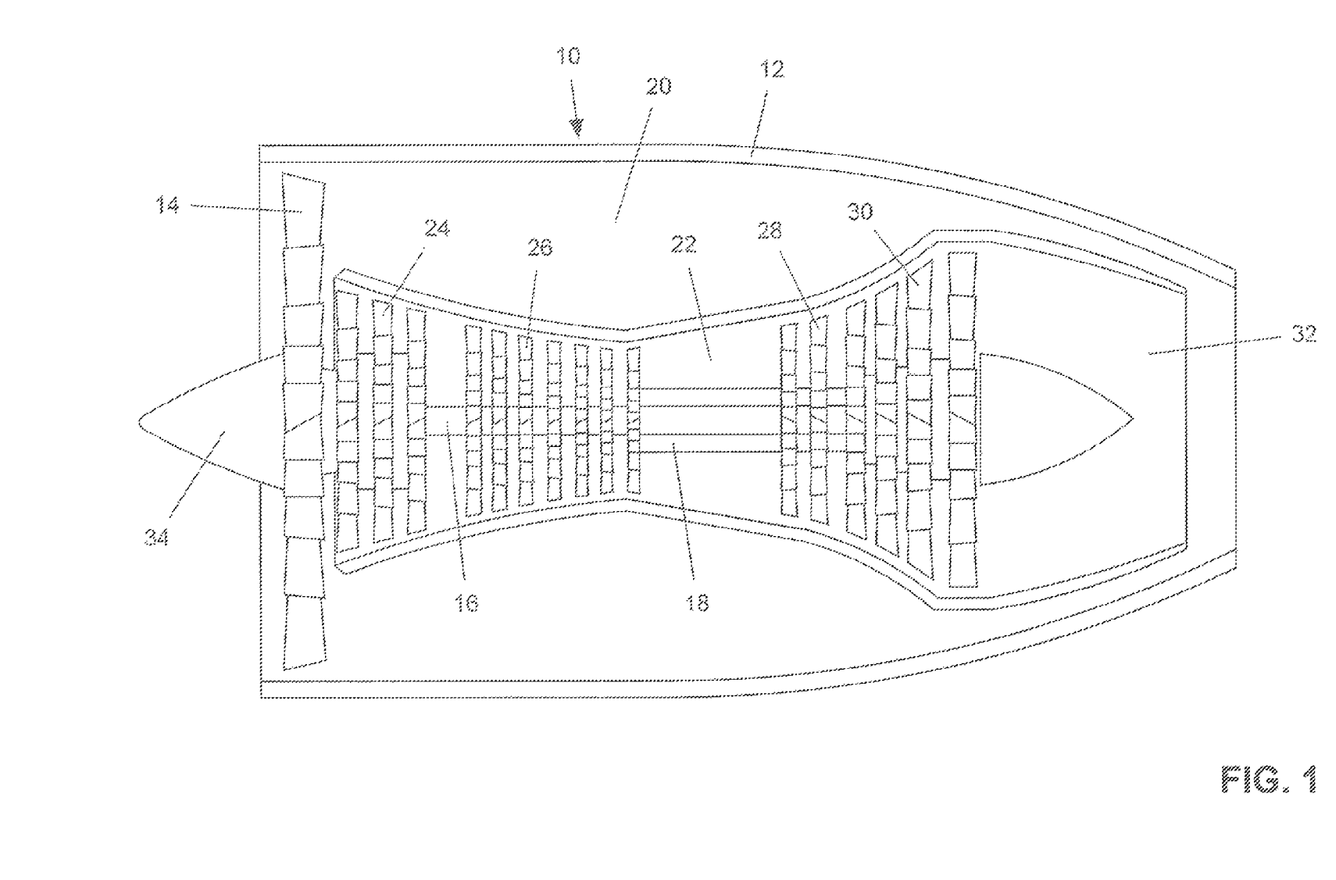
FIG. 1 is a diagrammatic view of a turbofan jet engine, the cleaning of which may be performed by the present invention.

FIG. 1 is a diagrammatic representation of a turbofan jet engine 10, which is exemplary of a type of jet engine with which the present invention can be utilized. Engine cowling or nacelle 12 surrounds the operating elements of the engine, which include main turbofan 14 which is connected to low pressure shaft 16. With the engine in operation, the fan 14 directs a portion of the incoming air through low and high pressure compressor stages 24 and 26 into the engine's combustion chamber 22 and the remainder of the air into bypass duct 20. After passing through both the low and high pressure compressor stages 24 and 26 the combustion air is combined with jet fuel and ignited in the combustion chamber 22.

The hot combustion gasses travel rearwards, expanding through and driving high and low pressure turbine stages 28, 30, before exiting the engine through the exhaust assembly 32. The turbines 28 and 30 provide the rotational force for the main propulsion fan and core engine compressor stages, to which they are linked by the low pressure shaft 16 and a concentric high pressure shaft 18. Forward thrust is provided primarily by the by-pass air flow from the main fan (typically 60 to 80% of total thrust) with the remainder being generated by the hot exhaust gasses emanating from the core engine. A cone or dome shaped spinner 34 is located at the center of the main fan assembly 14 to help smoothly direct a proportion of the incoming air flow away from the center into the core compressor inlet annulus.

Effective cleaning of any jet- or turbo-shaft engine thus requires that (a) all the rotating and stationary vanes of the core engine compressor are comprehensively and continuously wetted and flushed during the injection phase by the cleaning solution and rinsing water and (b) that sufficient cleaning solution and rinsing water is carried through the combustion and turbine stages with the air flow to ensure no re-deposition of removed—and potentially corrosive—contamination from the front stages of the core engine compressor into the hot section of the engine where it can later help promote so-called hot-end corrosion. Since the majority of jet- and turbo-shaft engines utilize axial flow compressors, it is not physically possible for the upper half stator vanes to be wetted, cleaned and flushed by nozzles located only in the lower half of the engine inlet because the injected fluid can only travel through the compressor in linear striations—as does the air flow itself—and not be centrifuged or thrown up into the upper half of the compressor. As such, the only feasible way of ensuring complete wetting of all the stator stages of any axial bow compressor is to physically inject the cleaning solution and rinsing water in a completely radial manner with a complete circumferential array of nozzles as employed in the present apparatus and method.

Figure 2:
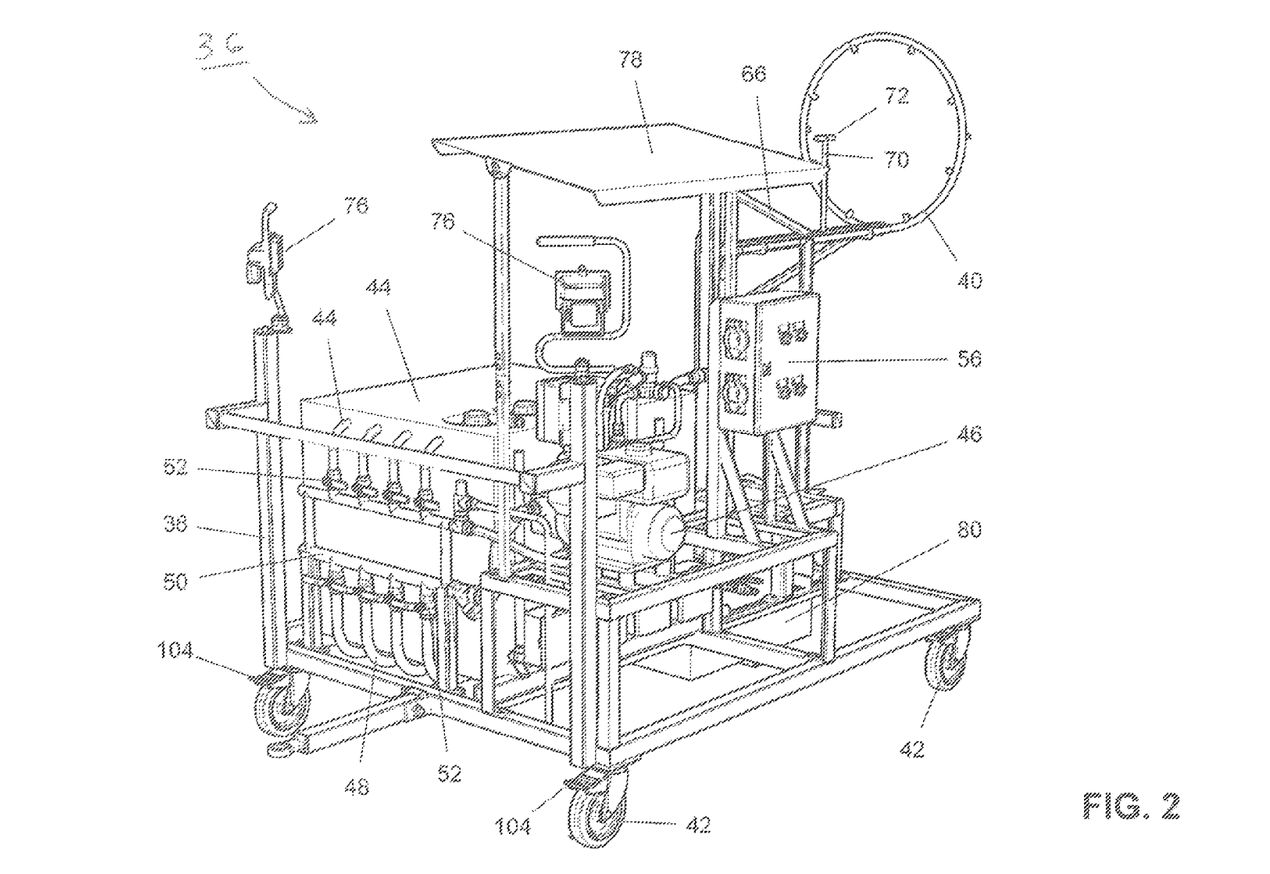
FIG. 2 is a rear quarter perspective view of an apparatus constructed in accordance with the present invention with the wash ring in an operative position.
Figure 3:
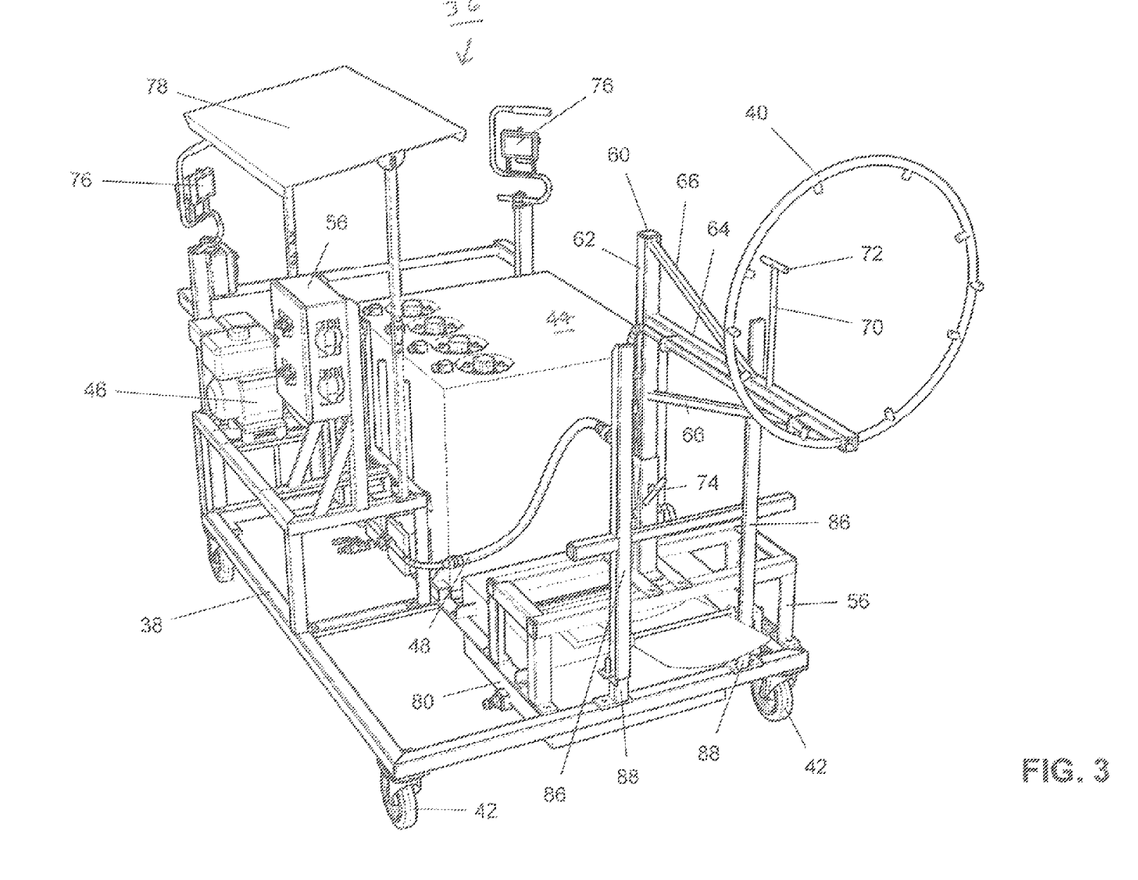
FIG. 3 is a front quarter perspective view of the apparatus.
Figure 4:
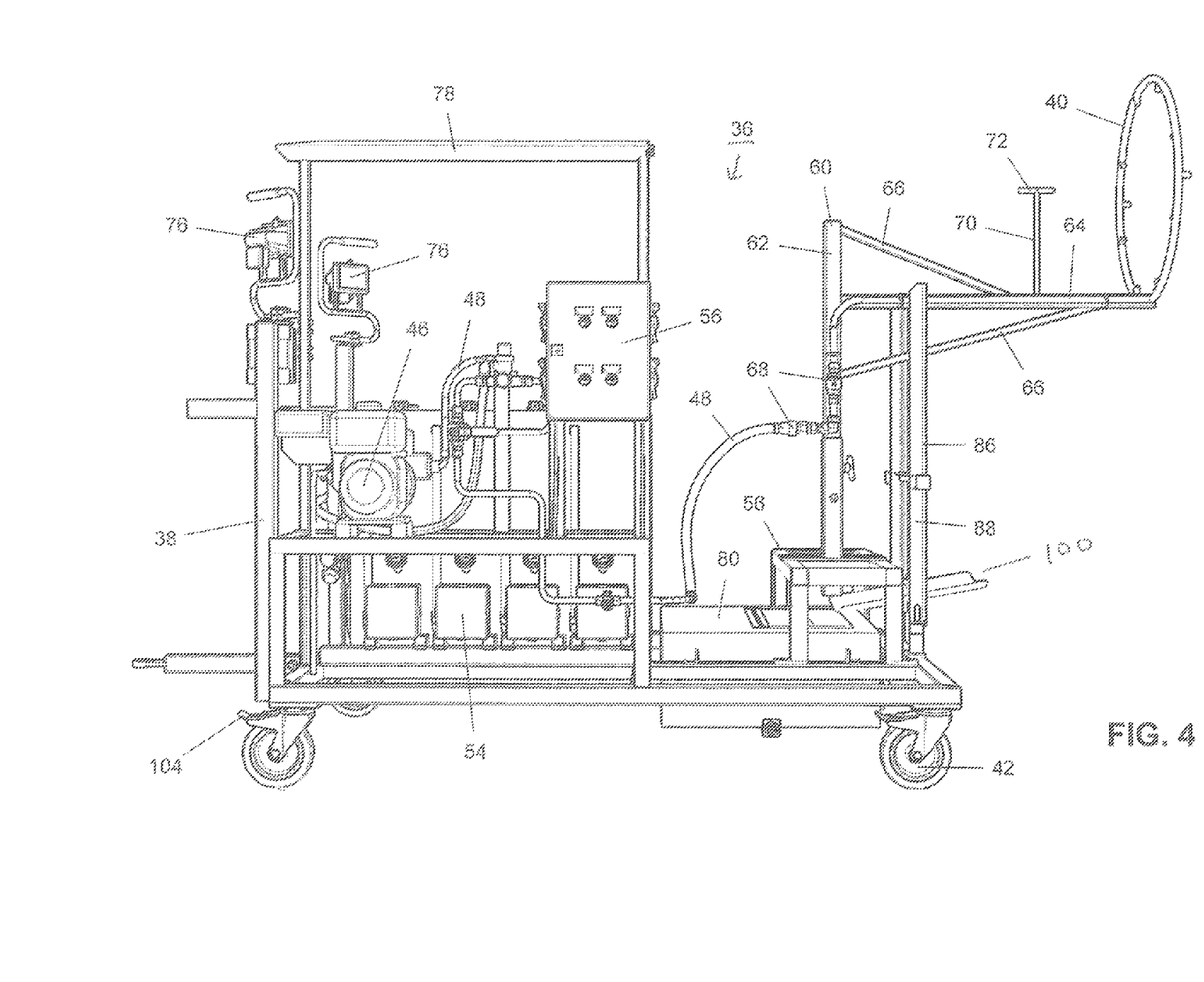
FIG. 4 is a side perspective view of the apparatus.

As shown in FIGS. 2-4, the inventive cleaning apparatus 36 comprises cart 38 supporting wash ring 40, which is to be positioned within the engine nacelle 12, at the forward end of the spinner and aligned concentrically thereto. The cart is towable, provided with wheels 42, allowing it to be moved into and from any operating location or position. Wheel locks 104 may be provided to allow the cart to be secured temporarily in the precise operating position. The cart may be in the form of an open framework supporting the operational elements of the wash system, as shown, or may be fully enclosed as may be preferred. Tank assembly 44 provides storage for the solutions to be sprayed and typically will have two, three, four or more separate sections, each capable of carrying a desired volume and type of solution. Typical dimensions tor the dart are on the order of 2000 mm long×1400 mm wide (c. 79 inches×55 inches).

If water only is to be used as the cleaning and rinsing medium ail the tanks can be used to carry the water. However, if the operator wishes to use a chemical solution to improve the cleaning result any of the tanks can be filed with a desired solution. All the tanks are cross connected by a common suction and return manifold 50 which allows a cart-mounted pump system 46 to be used for the recirculation of contents from one tank to another and for the blending or pre-mixing of the tanks' contents.

Tank heaters 54 are provided to bring the tank contents to a desired temperature, typically about 150 to 200° F. The heaters are electrically powered, with heater control and switch panel. 56 operatively connected to the heaters to monitor and regulate the heaters as appropriate. As there is usually limited electrical power available at the location at which a cleaning is performed, the tanks are well insulated to allow the content to be heated to the desired temperature at a remote location, such as a hangar, the contents remaining at temperature when the cart is brought to the cleaning location and the cleaning process performed.

An engine driven pump assembly 46 pumps the solutions from the tanks through piping system 48 to and from wash fluid manifold 50 and therefrom to the wash ring 40. The engine is preferably gasoline or diesel driven, again because sufficient electrical power in normally unavailable at a cleaning site to operate electrically driven pumps. Valves 52 associated with each of the tank's suction and recirculation piping allow the operator to choose the tanks' contents to be dispensed, either as the contents of a given tank is expended, as appropriate for dispensation during different stages of a cleaning process, or for chemical blending purposes although, as indicated above, pure water is presently contemplated by many airlines to be the preferred medium for all stages of the cleaning process to avoid contamination or other undesired effects. Typical operating pressure for the system is 15 to 40 BARG (c. 220 to 488 psig), depending upon the desired wash water flow rate from the spray ring. Multi-stage in-line filters 68 are provided on the discharge side of the pomp to ensure that contaminants do not reach the spray ring to either clog the spray nozzles or be carried to the engine to be cleaned. The piping from the pump to the spray header may also be insulated to maintain liquid temperature without need of continuous heating during cleaning.

Extending vertically upward from support frame 58 is spray ring mast assembly 60, comprising vertical arm or mast 62, main forwardly-extending horizontal arm 64, and upper and lower diagonal brace arms 66. Wash ring or header 40 is mounted at the distal end of the horizontal arm, extending upwardly therefrom. T-shaped alignment rod 70 is likewise permanently positioned on the horizontal arm, behind the spray ring, with a top, horizontal sighting bar 72 of the rod being aligned with the center of the spray ring, to allow the ring to be properly positioned with respect to the engine to be cleaned. Vertical mast 62 can be raised and lowered and held in position by clamp means 74, to accurately center the spray header in alignment with the spinner of the engine, whose center line from the ground may vary due to variables in aircraft weight and/or uneven ground at the time of washing. The mast and header assembly may be rotated 180 degrees between its operative position as shown in the figures and a stowed position in which the ring faces backward and lies above the cart base. The length of arm 64 upon which the was ring is mounted may vary, depending upon the physical size of engine to be washed, and specifically the distance from the inlet lip of the engine nacelle to the face of the front main fan. The wash ring is typically to be located about 6 inches away from the face of the fan. Engine nacelle bumpers 86, mounted to the forward faces of posts 88 at the front of the cart, allow the cart to be positioned gently abutting the front of the engine nacelle and prevent the ring from being over-inserted into the engine and contacting the main fan.

Auxiliary equipment, such as-adjustable flood lights 76 and a sunshade 78 may be provided on the cart. A waste water tank 80 with a collection port through its top surface may also be provided at the front of the cart to receive the spent cleaning solution and rinsing water that drips from the engine during and after the wash, which may be captured by a sluice system that is positioned under the engine to direct the waste water by gravity into the waste water tank.

Figure 5:
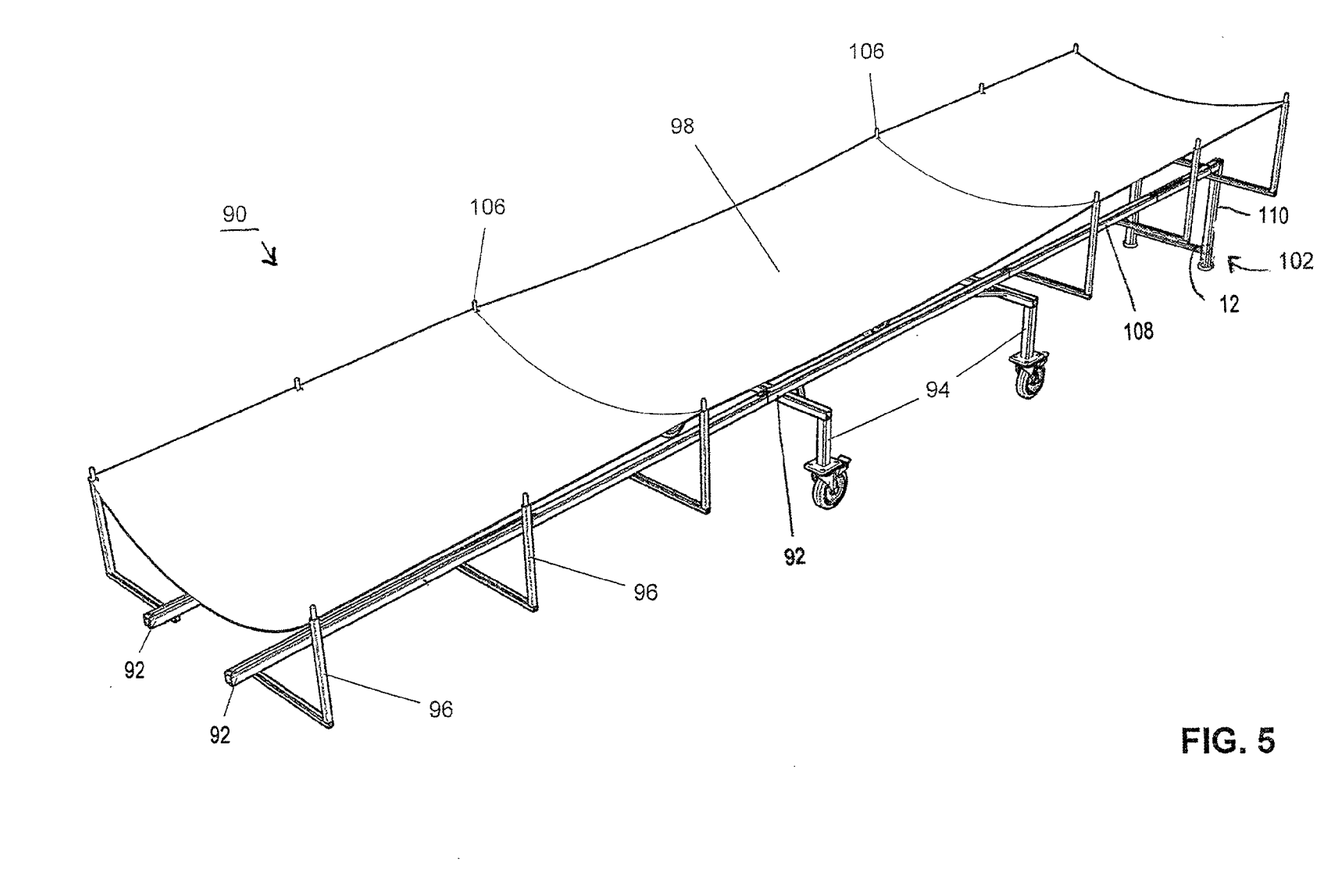
FIG. 5 is a perspective view of a sluice cart which maybe utilized in conjunction with the spray cart of FIGS. 2-4 to collect drained wash fluids.
Figure 6:
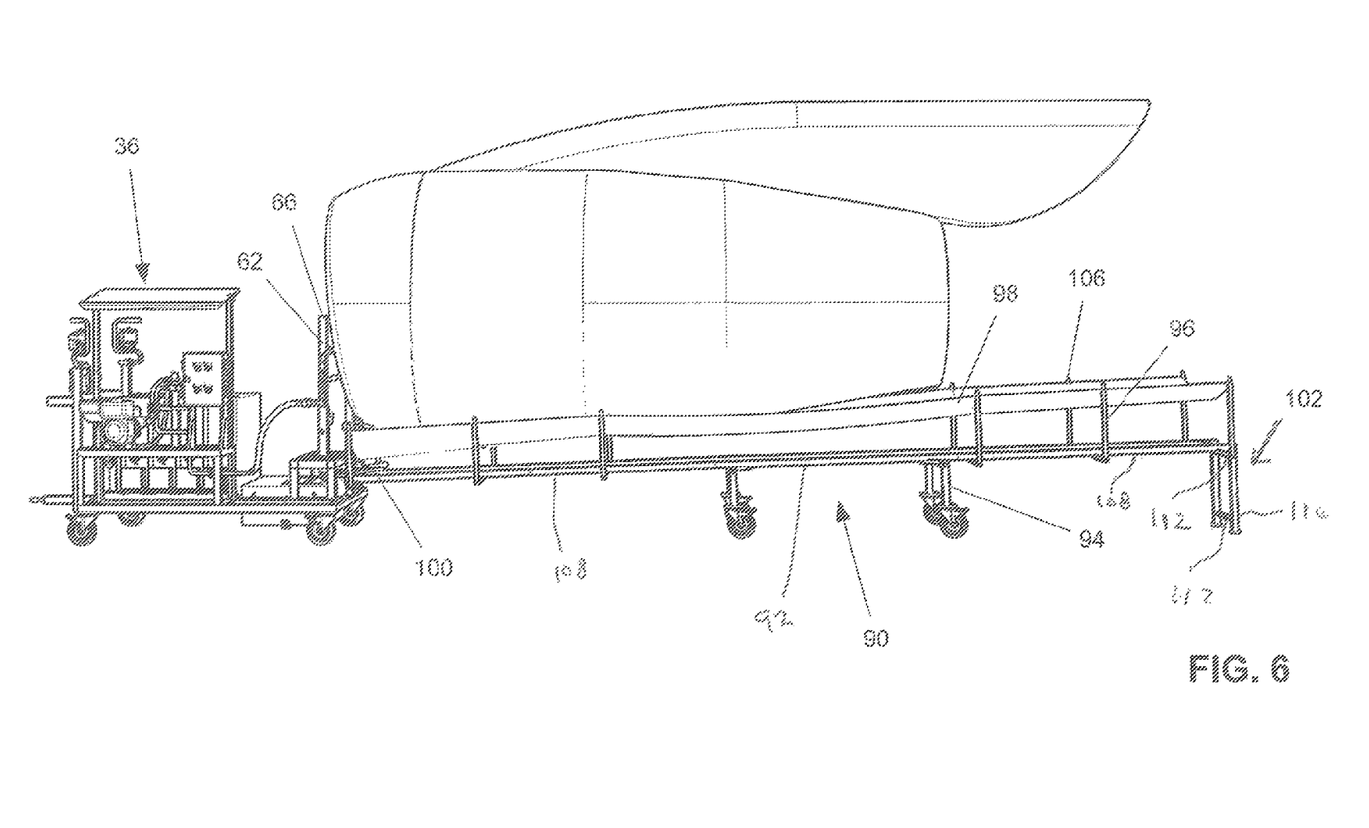
FIG. 6 is a side elevation view of the apparatus in place for the cleaning of a jet engine together with the sluice can system placed under the engine.

In particular, to collect the water drippings, a slake cart assembly 90 as depicted in FIG. 5 may be employed and positioned under the engine to be cleaned, as depicted in FIG. 6. The sluice cart may comprise a central unit having a pair of parallel, laterally-extending main rails or beam segments 92 mounted to a pair of wheel assemblies 94, forming a cart-like construction. Removable front and rear extension rails 108 connect to and extend the mall rails both forwardly and rearwardly, typically through a mating plug and socket form of connection, retained by a removable transverse pin through the joint. The extension rails in turn support pairs of L-shaped uprights 96, the upper ends of which support the sides of sluiceway 98. The sluiceway may be constructed of canvas or other flexible, waterproof material, and may comprise a series of overlapping segments for ease in assembly and disassembly. The width of the segments is such that they droop between the sides of the cart, forming a collection channel or pathway for the dripping water. The segments may be provided with grommet holes through which pins 106 at the upper ends of the uprights 96. The heights of the uprights 96 arc chosen such that there is a downward slope to the sluiceway from the rear to the front of the cart on the order of 2° to allow the collected water to flow towards the collection lank on the wash cart. The forward end of the sluiceway sits above a removable collection tongue 100, seen in FIGS. 4 and 6, which is mounted on the wash cart and directs the collected water into the waste water collection tank 80. The collected water waterfalls from the sluice onto the tongue and therefrom into the collection tank.

The rear end of the sluice can may be provided with a removable handle assembly 102 to allow the cart to be positioned as required under the engine, also connectable to the rails by a plug and socket connection. The legs 110 of the handle are joined by upper and lower cross beams 112, a pair of stubs allowing for a plug and socket connection between the handle assembly and the rails. In addition to allowing the sluice cart to be properly positioned adjacent the wash cart and below the engine to be cleaned, the handle assembly provides support for the distal end of the rear extension rails and helps maintain the proper slope to the sluice. The length of sluiceway 98 is such that it preferably underlies the entirety of the engine as well as extending for a distance beyond its exhaust end to capture any exhausted liquid that is of sufficient size to fall into the sluiceway rather that evaporating or being carried further off by the exhaust flow. A typical overall sluiceway length would be on the order of 800 cm (315 inches), with the central rail sections being on the order of 200 cm in length and the extension rails each having a length on the order of 150 cm. Upon disassembly, both the extension rails and handle assembly can be stored on the central unit along with the sluiceway segments.

Figure 7:
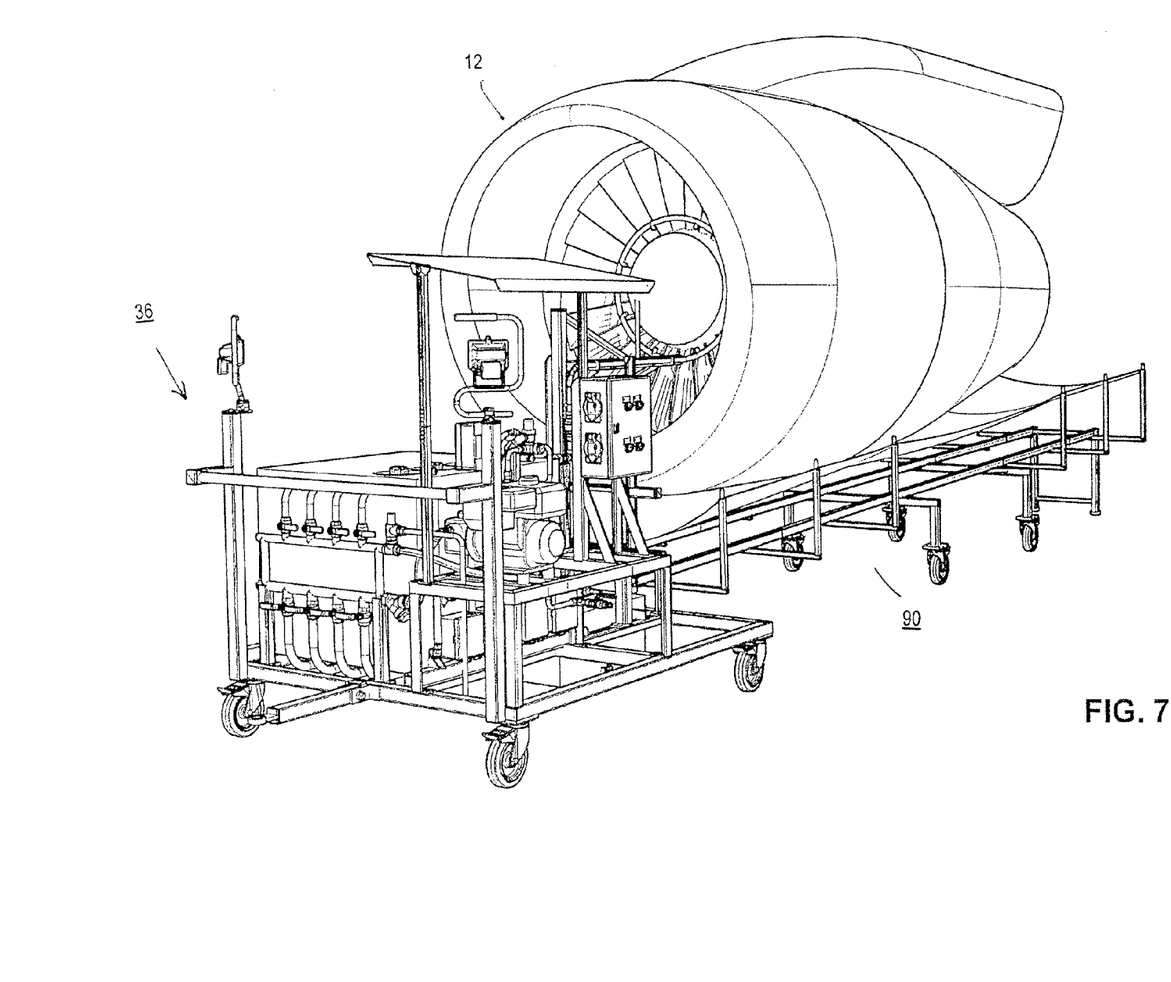
FIG. 7 is a perspective view of the apparatus in place.
Figure 8:
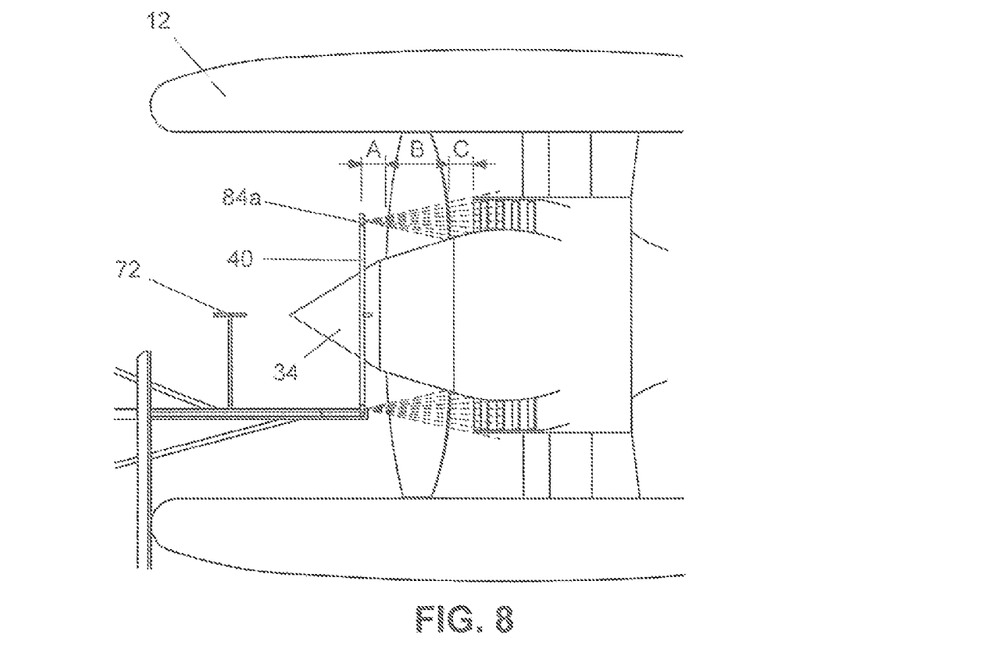
FIG. 8 is a side diagrammatic view of a partial interior of a jet engine with the wash ring in place, detailing the orientation of a first group of spray nozzles for the cleaning of the core engine compressor.
Figure 9:
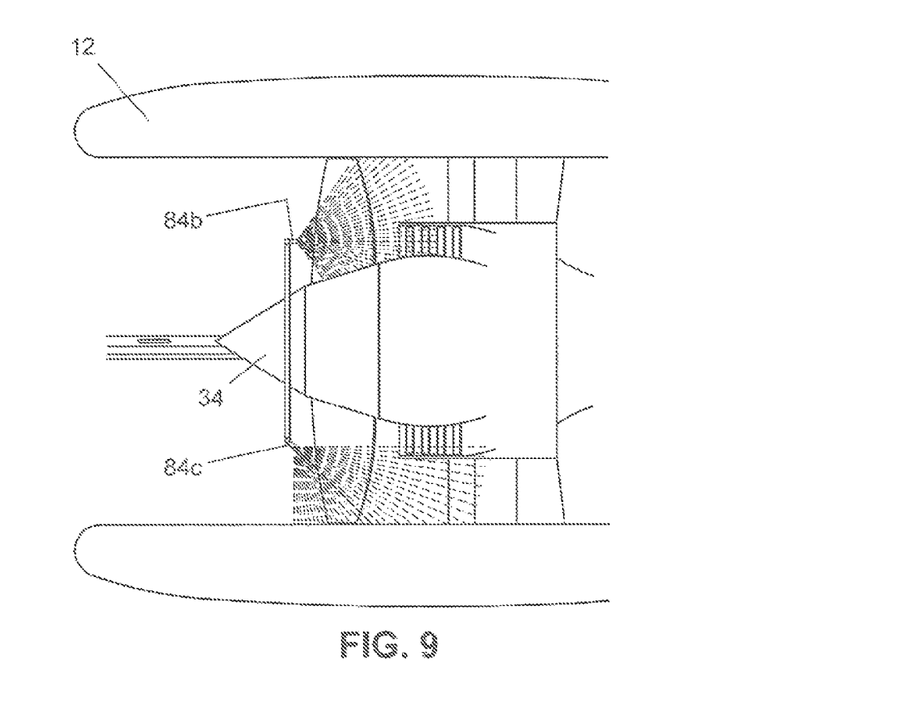
FIG. 9 is a plan diagrammatic view, similar to that of FIG. 8, detailing the orientation of further spray nozzles which are positioned for the cleaning of the engine main fan.

With further reference to FIGS. 7, 8 and 9, wash ring 40 bears a plurality of spray nozzles 84, through which the wash fluid solutions are ejected to impinge upon and clean the internal surfaces of the engine. The nozzles are arranged in sufficient number and positioned about the ring to provide a spray pattern that is disbursed evenly and completely about the engine intake. A preferred nozzle is of the type disclosed in U.S. Pat. No. 8,028,936 to the present inventor, which provides a high degree of atomization over a range of flow rates, allowing high spray efficiency with minimal wash fluid waste. A typical arrangement of nozzles on the wash ring may incorporate three different nozzle orientations. As may be seen in FIG. 8, the wash ring 40 is typically sized such that its diameter allows a first set of nozzles 84a, with their spray axis parallel to the engine centerline, to spray directly into the engine core, towards the first compressor stage blades, with a relatively narrow spray cone in the range of 30-40°. These nozzles may preferably be 8 in number, located equally about the spray ring, each being of a dual side spray construction to generate a total of lb solid spray cones, providing a primary spray pattern. As shown in FIG. 9, two additional nozzles 84b, which may be diametrically opposed to each other on the ring, are arranged on the wash ring to provide a wider and supplemental spray pattern. One of the nozzles is angled to cover the outer two-thirds of the fan blades as they rotate, with a spray width m the range of 110°, while the other nozzle is angled to produce a spray impinging on the inner one-third of the ran blades. Here the angle of the spray may be in the range 90°, with a spray axis at a 45° angle to the engine centerline. Such an overall arrangement of nozzles can be effectively achieved with the nozzle construction of the '936 patent, which provides for nozzles with one or more orifices, allowing for a range of spray angles and flow rates. It is to be recognized that the number of nozzles and nozzles sets and their respective orientations is dependent on the specific requirements of a particular engine and fluid flow rate desired. With the nozzles being fixed in place on the wash ring, however, the possibility of operator error or misalignment resulting in improper or insufficient spray coverage is eliminated. The sole variable over operator control is flow pressure.

With continued reference to the figures, and in particular to FIGS. 6-9, to perform a cleaning operation the wash cart is placed in position in front of the engine to be cleaned with the wash ring 40 generally aligned with the engine inlet, the wash ring assembly further adjusted and oriented such that the wash ring is concentric with and positioned within the engine cowling. The relationship between the bumpers and length of the wash ring mast arm 64 is such that, positioning the cart such that the bumpers 86 rest against the front of the engine nacelle, the wash ring is positioned at a spacing "A" about six inches in front of the main engine fan 14. The wheel brakes on the cart can then be applied to keep the cart and spray ring in position. Setting of the projecting distance of the spray ring in front of the bumpers before the cart is moved into position, based on the dimensions of the engine to be cleaned, ensures that there will be no contact between the spray ring and any portion of the engine as the cart is placed in position. The center of the spray ring, as indicated by the alignment rod element 72, is aligned with the center of the engine and spinner 34. Properly aligned, there is no physical contact between the wash ring and any engine components. The sluice cart 90, if used, can then be placed in position under the engine and the collection tongue 100 positioned between the front end of the sluiceway 98 and the wash cart collection tank 80. The engine is turned by its starting system and the cleaning fluids injected into the engine, the atomized spray being drawn thro ugh the engine for impingement on all engine surfaces by the suction draw created by engine rotation. As typical starting systems do not provide for engine turning in excess of two minutes, the engine (and cleaning spray) may be shut down and restarted periodically for a complete clean. Once the cleaning is completed, the engine may be placed in a final turning or drying run to exhaust any fluid remaining on the engine surfaces.

The finely atomized injection of cleaning solutions and rinse waters substantially lessens the amount of liquids needed as compared to deluge wash procedures utilized in marry conventional systems. The majority of the liquid injected exits the engine and evaporates. Accordingly, there is little if any accumulation of wash fluids inside the engine after the cleaning has been completed. During the cleaning process cleaning liquid (and washed contaminants) not discharged through the engine's exhaust fall to the bottom of the engine nacelle, and pass through openings therein onto the sluiceway 98 of sluice cart 90. They then flow into the wash cart's collection tank 80 for reprocessing or disposal. The collected liquid can be transferred to other containers for disposal or may be filtered or otherwise treated as appropriate such that the liquid can be reused.

What is claimed is:

1. An apparatus for the cleaning of a turbine engine, comprising:
a wash cart; a cart-mounted reservoir for cleaning fluid; a wash ring operatively mounted to the cart positionably adjustable for directing a spray of atomized cleaning fluid into an inlet of the engine without physical contact between the wash ring and engine; and a pump system connected to the reservoir and wash ring for delivering a controlled pressurized flow of cleaning fluid from the reservoir to the wash ring for spray by the wash ring; and spacing means associated with the cart for contact with the engine nacelle to provide proper horizontal spacing of the wash ring within the engine.

2. The apparatus of claim 1, wherein the wash ring has a plurality of atomizing spray nozzles located about a periphery of the wash ring.

3. The apparatus of claim 2, wherein the plurality of spray nozzles comprises nozzles directed at different portions of the engine.

4. The apparatus of claim 3 wherein at least one of the nozzles is oriented to spray fluid directly at compressor blades of a core of the engine.

5. The apparatus of claim 3 wherein at least one of the nozzles is oriented to spray fluid across surfaces of a turbofan of the engine.

6. The apparatus of claim 5 further comprising a heating system for the tanks, the tanks being thermally insulated.

7. The apparatus of claim 1, wherein the wash ring is mounted to an extendable vertical mast extending upwardly from the cart for providing vertical positioning adjustment for the wash ring without affecting horizontal spacing between the wash ring and the engine.

8. The apparatus of claim 7, further comprising alignment means for the wash ring mounted to the mast assembly.

9. The apparatus of claim 8 wherein the alignment means comprises a fixed horizontal sighting bar aligned with a center of the wash ring for aligning the center of the wash ring with a spinner of the turbine engine.

10. The apparatus of claim 1, wherein the pump system includes an internal combustion engine operatively connected to a pump.

11. The apparatus of claim 1, wherein the reservoir comprises a plurality of tanks and the pump system includes a manifold operatively connected to the tanks for controlling a flow of fluid from the tanks through the pump system.

12. The apparatus of claim 11 wherein the collection means comprise a sluiceway, the wash cart having a collection tank for the used cleaning fluid, the sluiceway being coupled to the collection tank.

13. The apparatus of claim 1 further comprise a collection cart for used cleaning fluid positioned below the engine.

14. The apparatus of claim 1 wherein the spacing means comprises a bumper on the cart.

15. A method for the cleaning of a turbine engine, comprising the steps of:
    positioning a cart having a reservoir for cleaning liquid, a wash ring, spacing means and a pumping system operatively connecting the reservoir to the wash ring in front of the engine to be cleaned;
    contacting the spacing means with the engine to properly space the wash ring within the engine and aligning the wash ring with respect to the engine such that a center of the ring is along a centerline of the engine without any contact between the ring and engine; and
    atomizing and spraying the cleaning liquid from nozzles on the wash ring into the engine.

16. The method of claim 15, further comprising the step of running the engine as the cleaning liquid is sprayed from the nozzles.

17. The method of claim 15, wherein the aligning step includes positioning the wash ring within a nacelle of the engine and in front of a turbofan of the engine.

18. The method of claim 17 wherein the aligning of the wash ring comprises aligning a fixed horizontal sight rod aligned with a center of the wash ring with a spinner of the engine.

19. The method of claim 18 wherein the aligning of the wash ring comprises adjusting the height of a fixed vertical mast on the cart to which the wash ring is mounted without affecting the horizontal spacing between the wash ring and engine.

20. The method of claim 15 wherein the spraying step includes directing spray simultaneously from different nozzles at different engine locations.

21. The method of claim 20 wherein at least one of the locations is chosen from a group consisting of compressor blades of a core of the engine, surfaces of a turbofan of the engine, and an inner wall of a nacelle of the engine.

22. The method of claim 15 wherein the spraying step is performed through operation of the pumping system, the pumping system being driven by a cart-mounted internal combustion engine having a cart-mounted fuel supply.

23. The method of claim 15 further comprising the step of heating the cleaning liquid in the reservoir to a desired temperature prior to positioning the cart in front of the engine and passively maintaining the liquid substantially at the desired temperature when the cart is positioned at the engine and the cleaning liquid is sprayed.

\* \* \* \* \*